US010503120B2

(12) United States Patent
Smithwick

(10) Patent No.: US 10,503,120 B2
(45) Date of Patent: Dec. 10, 2019

(54) THREE-DIMENSIONAL DISPLAY WITH AUGMENTED HOLOGRAMS

(71) Applicant: DISNEY ENTERPRISES, INC., Burbank, CA (US)

(72) Inventor: Quinn Y. Smithwick, Pasadena, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 422 days.

(21) Appl. No.: 15/211,006

(22) Filed: Jul. 15, 2016

(65) Prior Publication Data

US 2018/0017940 A1 Jan. 18, 2018

(51) Int. Cl.
*G03H 1/30* (2006.01)
*G03H 1/22* (2006.01)
*G03H 1/24* (2006.01)
*G02B 27/00* (2006.01)

(52) U.S. Cl.
CPC ............ *G03H 1/30* (2013.01); *G02B 27/0093* (2013.01); *G03H 1/2249* (2013.01); *G03H 1/24* (2013.01); *G03H 2001/2284* (2013.01)

(58) Field of Classification Search
CPC .......... G03H 1/30; G03H 1/22; G03H 1/2249; G03H 1/24; G03H 1/265; G03H 2001/2231; G03H 2001/2284; G03H 2210/32; G03H 2250/33; G02B 27/009; G02B 27/2214; G03B 21/26; G03B 21/56; H04N 9/3185
USPC .......................................................... 359/25
See application file for complete search history.

(56) References Cited

U.S. PATENT DOCUMENTS

| 8,564,865 B2* | 10/2013 | Klug ..................... G03H 1/22 359/23 |
| 2007/0081207 A1* | 4/2007 | Bimber .................... G03H 1/22 359/9 |
| 2015/0029314 A1* | 1/2015 | Reichow .............. H04N 9/3147 348/51 |
| 2017/0011690 A1* | 1/2017 | Oya ..................... G09G 3/3406 |

FOREIGN PATENT DOCUMENTS

JP 2005-49675 A * 2/2005 ............... G03H 1/30

* cited by examiner

*Primary Examiner* — Stephone B Allen
*Assistant Examiner* — Jyotsna V Dabbi
(74) *Attorney, Agent, or Firm* — Marsh Fischmann & Breyfogle LLP; Kent A. Lembke

(57) ABSTRACT

A system for displaying, to viewers who do not need to wear special eyewear, static three dimensional (3D) images that are dynamically augmented with two dimensional (2D) images. The system includes a holographic print with a front surface and a back opaque layer. The system includes a projector projecting light onto the front surface. The projected light includes first light reconstructing a hologram from the front surface of the holographic print and second light displaying 2D content on the front surface. The projector is positioned to cause the first light to strike the front surface within a range of hologram reconstruction angles. The projector is a video projector, and the first light is even illumination in the form of white light while the second light includes the displayed 2D content. The displayed 2D content includes animation or video content.

9 Claims, 5 Drawing Sheets

THREE-DIMENSIONAL DISPLAY WITH AUGMENTED HOLOGRAMS

BACKGROUND

1. Field of the Description

The present invention relates, in general, to devices and methods for providing a three-dimensional (3D) display in a glasses-free manner, and, more particularly, to a display system adapted for providing a static holographic image concurrently with animation (e.g., two-dimensional (2D) animation) to provide viewers of the display system's output glasses-free viewing of enhanced 3D imagery and visual effects.

2. Relevant Background

Displays that provide the illusion of three dimensions have experienced a rebirth in the past few years. For example, a number of 3D televisions are now available for use in homes and home theaters. These 3D televisions generally operate by displaying a stream of left and right eye images in an alternating or time-multiplexed manner (e.g., left-right-left-right). Switching occurs so quickly that the viewer does not sense a flicker or change in the display. The viewer wears special headgear or glasses that operate in a synchronized manner with the display to only allow the light associated with the left eye image to reach the viewer's left eye and with the right eye image to reach the viewer's right eye.

While most commercial displays rely on the use of special glasses, it is generally agreed by those in the 3D entertainment industry that displays able to provide a 3D viewing experience without glasses or headgear offer significant advantages. Autostereoscopy is any method of displaying stereoscopic images (i.e., adding binocular perception of 3D depth) without the use of special glasses or headgear on the part of the viewer. Many autostereoscopic or glasses-free 3D displays have been developed using a variety of technologies including lenticular lenses on the display screen combined with interlaced content, screens configured as parallax barriers, volumetric displays, and holographic and light field displays. However, each display technology has to date been proven to have limitations that have limited their widespread adoption.

For example, 3D televisions have been configured as lenticular autostereoscopic displays. The 3D lenticular television is mounted vertically on a wall or on a support base, and a viewer has multiple view images directed toward their eyes through a plurality of lenticules (or elongated lenses) that extend vertically upward or in a slanted manner upward on the outer surface of the display monitor. The 3D lenticular television may provide 1920 by 1200 pixels that are used to display an 8-view autostereoscopic image through the lenticules (or lens array or lenticular sheet). To this end, the image content (or digital image file) is interdigitated or interlaced as a number of slices (e.g., 8 slices in this example) of images that include multiple view images to provide the 3D effect, and the set of interlaced slices are displayed and repeated under each lenticule. These 3D televisions have a number of drawbacks in practice. The viewer typically has to remain in a particular location relative to the front surface (lenticular sheet) of the display/monitor such as directly in front of the display/monitor and with their head (and left and right eyes) at a predefined height (e.g., a height matching the center of the display/monitor). The lenticular 3D television only provides views horizontally so if the viewer is at too great of a height (or too low of a height) the 3D image is viewed from an incorrect perspective, resulting in a distorted image that appears in an undesirable or unrealistic manner.

In other settings, the goal of designers of display devices is to provide a high-quality 3D display that is viewable by many observers or viewers. Some of these 3D displays would be used to represent futuristic information or command and control displays as seen in movies in which 3D images float above table tops (also called situational sandboxes) with dynamic symbols and information being presented. Often, these 3D images are represented in the movies as being holographic images.

Holographic prints can be used to produce very high (or even the best) quality 3D images. However, holographic prints only provide static holographic or 3D images whereas display designers are being asked to provide imagery that moves or is animated (video 3D images or imagery that can be updated or changed over time such as to provide new control information in the control display example). Research is underway on techniques for providing true holographic video, but, presently and likely at least for the near term, the quality and performance of these true holographic video displays do not match the vision and expectations for a high quality 3D display system in the viewers' minds and imaginations. Also, these holographic video display devices are prohibitively expensive for most applications.

SUMMARY

The inventor determined that there was a need for, and worked to design and create, a 3D display system (and corresponding method) that provides a "stop-gap" display until true holographic video displays can be more practically implemented. The 3D display system provides designers of 3D displays and visual effects a way to present an experience that matches the vision presented in the movies of futuristic 3D displays and environments. Further, the 3D display system is relatively inexpensive to produce and is possible using presently available technologies via unique combinations and modifications identified by the inventor.

The inventor recognized that in many of the movie scenes with command and control-type holographic displays, there are large portions of the display that are static such as holographic images of buildings, landscapes, and so on. Only small portions of the movie-portrayed 3D images are dynamic such as to provide symbolic data, gauges, and floating 2D video feeds. With such a 3D display effect in mind, a 3D display system was designed by the inventor that represents the static portion of the 3D display with a high-quality static holographic print(s). The dynamic portions, though, are provided by the 3D display system by augmenting the 3D or holographic image with multiple smaller dynamic imagery (or animated image streams) such as from lower-quality 2D displays, 3D multi-view displays, 3D volumetric displays, and/or even physical props that are beam-combined with the holographic image (e.g., are Pepper's Ghosted in).

More particularly, a system is provided for displaying, to viewers who do not need to wear special eyewear, static three dimensional (3D) images that are dynamically augmented with two dimensional (2D) images. The system includes a holographic print with a front surface (e.g., a layer or surface with the holographic diffraction pattern) and often a back opaque layer to increase contrast. The system also includes a projector projecting light onto the front surface. The projected light includes a reconstruction beam (e.g., even white point-like (or collimated) illumination) reconstructing a hologram from the front surface of the holographic print, with the 2D content being patterned onto the reconstruction light being projected from the projector and the same point source (or collimated beam). The 2D content spatially modulates the intensity of the reconstruction beam such that at the hologram plane, the 3D holographic image is not or only partially reconstructed where the 2D imagery is dark or not full intensity. The viewer sees animated 2D imagery on the hologram plane augmenting static 3D holographic imagery. The projector may be a color video projector and further, to make the augmentation of the hologram "dynamic," the displayed 2D content includes animation or dynamic video content.

The 3D scene is reconstructed from the viewpoints on the holographic plane only where it is illuminated by the reconstruction beam. If a portion of the 2D imagery patterned on the reconstruction beam is dark or not full intensity or purely white, the 3D scene is not reconstructed (or only partially reconstructed in intensity or color) from that viewpoint on the holographic plane. The dark portion of the 2D imagery is perceived as an occluder on the hologram plane, while the bright portions are perceived as semi-transparent content or apertures on the hologram plane of the 3D scene reconstructed by the hologram. The reconstruction light acts as a first light to reconstruct the hologram and 3D imagery from those viewpoints on the hologram plane, while the projected 2D color imagery acts as a second light to reconstruct fully, partially, or not at all (effectively occlude) those viewpoints (and/or their color components) on the hologram plane (and the 3D imagery behind or in front of it).

Additional 2D animation may also augment the hologram from a different projector by projecting onto the hologram plate or a separate spaced angularly selective (holographic projection film) clear plate at an angle in which the hologram is not reconstructed but which scatters or reflects the 2D image from the second projector. In practice, the projector or point light is positioned to cause the first light to strike the front surface at an angle within a range of hologram reconstruction angles for the holographic print. A second light provided by a second projector may be light from a color video projector, and the first light may be wholly or mainly made up of white light. Further, to make the augmentation of the hologram "dynamic," the displayed 2D content from the second projector includes animation or dynamic video content.

DETAILED DESCRIPTION

Figure 1:
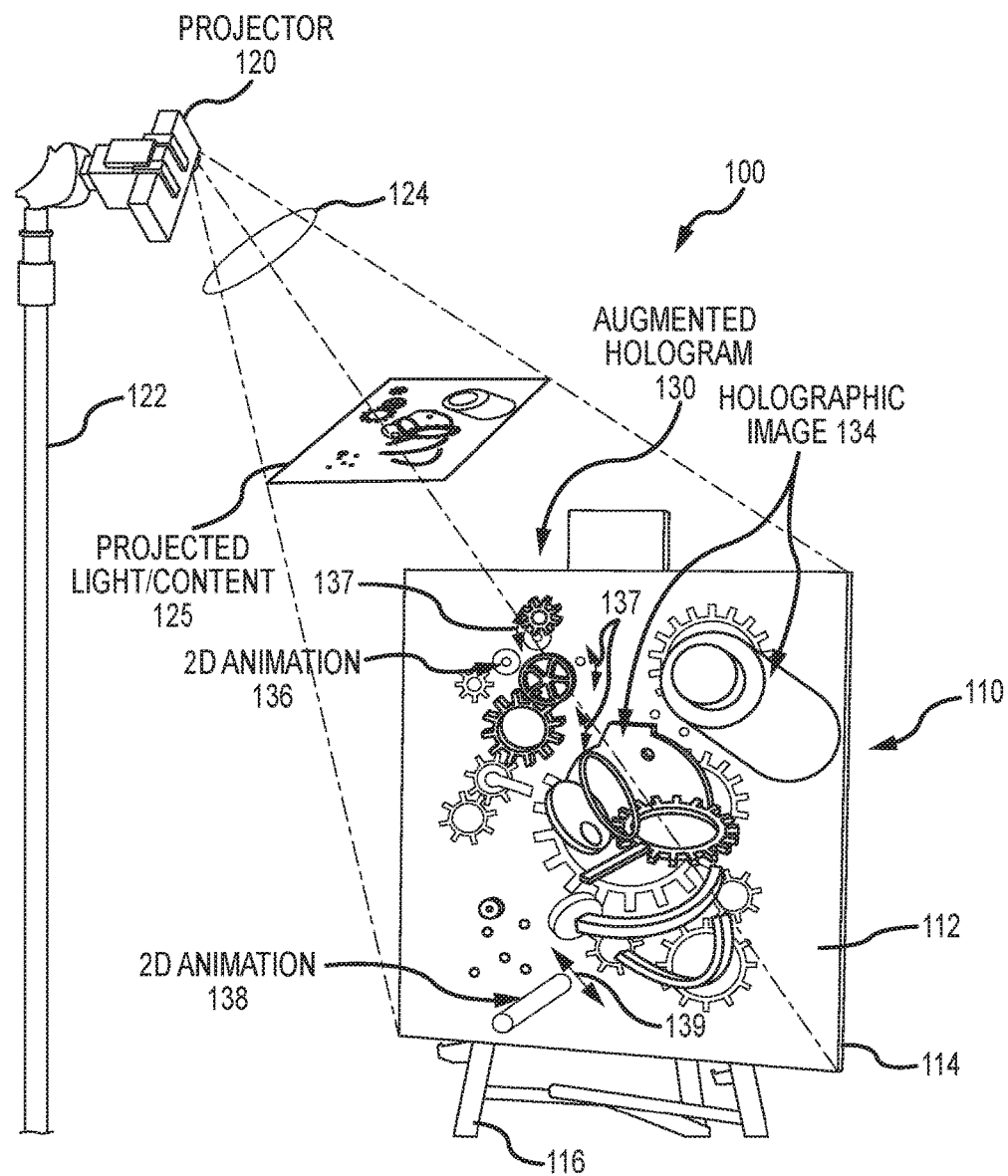
FIG. 1 illustrates a 3D display system of the present description during its operation to provide an augmented hologram (e.g., a holographic image augmented with 2D animation or projected imagery to display a dynamic hologram)

Briefly, a 3D display system is described that provides 3D images that are a combination of a static holographic image and animations (or animated images). In some embodiments, a static hologram (or holographic image) is augmented by concurrently displaying or adding in 2D animation. To this end, the 3D display system may include a holographic print (e.g., a reflective or transparent holographic element) configured to generate a static hologram. A projector is included in the 3D display system to project light (or projector output) onto the surface of the holographic print.

The projected light includes first light or a first portion that generates the static hologram and further includes second light or a second portion that projects animated images (e.g., 2D video stream) onto the holographic print (e.g., in areas or regions of the holographic print not being used to generate the static hologram). By carefully choosing a video projector's output, a viewer concurrently perceives or views (without special 3D eyewear) a 3D image provided by the static hologram and also animated imagery or content. The 2D animated imagery is located in the plane of the holographic print (e.g., the diffractive surface) while the static 3D image may protrude outward from this plane toward the viewer and/or may appear to recede away from this plane and the viewer.

As part of the design process for the 3D display system adapted to provide dynamic holographic imagery, the inventor first determined that it may be desirable to augment the 3D static hologram with projected 2D animation. However, projection onto a scrim overlaying the holographic print was determined to be potentially problematic because creating a quality hologram from a holographic print typically requires light that strikes the reflective surface from a single uniform point source to be faithfully reproduced. For small angles away from the optimal angle, the hologram appears distorted so that use of a projector near the hologram's reconstruction point light source would undesirably produce a second distorted hologram. For large angles away from the optimal angle, the hologram simply is not reconstructed.

To address these design challenges, one solution conceived by the inventor was to replace the single point light source typically used with a holographic print to reconstruct the hologram with a video projector, which acts as a programmable point source with an angularly/spatially modulated beam. The video projector is controlled in a unique manner to act to both reconstruct the hologram by providing first light (or a first portion of the projected light) to evenly illuminate areas of the holographic print and add 2D moving imagery in other areas of the holographic print where second light (or a second portion of the projected light) is used to modulate and animate the illumination of the holographic print.

In one exemplary prototype of a 3D display system, augmentation was provided in the way of sprite animation (an example of 2D animation), particle effects, and text annotation (e.g., control/command information for a futuristic 3D control panel) in the plane of the holographic print (e.g., projected upon the reflective surface of the holographic print). Rendering with perspective and shading was used in controlling the projector so as to make synthetic objects used to augment the hologram appear to leave the film plane.

In another implementation, the 3D display system is designed with the recognition that holographic prints are very sensitive to the angle of the reconstruction beam such that the hologram does not appear unless the reconstruction beam is provided within a small range of angles. This alternative 3D display system reconstructs the hologram using a point light source from a first angle and then uses a projector to project augmenting imagery (e.g., 2D animation, text, and so on). The projector projects its output light (or projected light) onto a scrim over and/or in front of the reflective surface of the holographic print, and projected light is provided at a second angle that differs from the reconstruction beam that is chosen to be outside the small range of reconstruction angles for the holographic print so that this projected light does not reconstruct a hologram.

Prior approaches to providing "animated" or dynamic holograms or similar 3D imagery have not proven wholly successful and/or are disadvantageous relative to the new 3D display system(s) described herein. Holographic video has been researched using lasers, DMDs (digital micromirror devices)/AOMs (acousto-optic modulators), and the like, but true holographic display is very complicated to implement and is still in the research phase. It also requires expensive hardware due to the large amount of information required. Lenticular or fly-eye 3D monitors also have been used to provide 3D imagery. However, these monitors typically have lower quality and depth range than true holograms. In contrast, the 3D display systems described herein involve projecting an augmented hologram, and the projection process is relatively simple and acts to dynamically augment the high quality 3D holographic imagery such as with 2D animation.

Some display approaches have used an angularly multiplexed hologram. Different holograms are recorded on a holographic film and recalled separately by using differently angled reconstruction beams. By cycling through the different reconstruction beam angles, a holographic animation can be created. One limitation with this approach is that angular multiplexing has a fixed number of animation frames. It can be made with random access but still limited frames. The change in illumination or the need to change viewpoints (or to rotate the hologram) is noticeable and visually bothersome to the viewer of such a display. In contrast, the projection-augmented hologram can have any 2D movie content on the screen (e.g., on the outward facing surface of the holographic print). Also, the second embodiment of the 3D display system takes advantage of the sensitivity or dependence of the hologram reconstruction beam angle, not to produce another holographic image, but, rather, to have the projector's light not reconstruct a distorted hologram but, instead, just project the 2D image onto a scrim placed over or in front of the holographic print.

Other researchers created display devices that used a transparent hologram rather than a reflective holographic print. These devices used a mask on the reconstruction beam and also used either a lenticular or 2D display from behind the transparent hologram to provide animation. The 3D display system provided by the inventor differs as it uses the projector's light to provide the reconstruction beam and also to provide the 2D animation rather than using a simple mask. In this way, the inventor's 3D display system does not need the lenticular or 2D monitor behind the hologram to provide animation. In the 3D display system discussed below, a reflection hologram or holographic print is used with an opaque backing layer to provide a bright holographic image readily visible to viewers of the 3D display system.

FIG. 1 illustrates a 3D display system 100 of the present description during its operation to provide an augmented hologram 130. The 3D image 130 is labeled an augmented hologram because it is made up of a concurrently viewable holographic image 134 that has added to it (or is augmented with) 2D imagery 136 and 138 that may be animated or dynamic as shown with arrows 137, 139 (e.g., the augmented hologram 130 is perceived to be a dynamic or video hologram).

To achieve this functionality, the 3D display system 100 includes a holographic print 110 with a diffractive front surface 112 and an optional opaque backing (or back layer) 114, with the holographic print or hologram element 110 being mounted on a frame or support member 116 in or near a viewing space in which viewers may be located. The holographic print 110 may be a conventional reflection hologram element/device that is a rendition of a holographic diffractive pattern on a flat surface producing 3D images or effects when illuminated properly (e.g., with light in a small range of reconstruction angles) that can be viewed by a viewer without the need for special eyewear.

The 3D display system 100 further includes a projector 120 that may take the form of a color video projector with relatively high brightness or illumination ratings. The projector 120 is supported on a support member 122 so as to be focused or directed at the desired reconstruction angle(s) onto the diffractive surface 112 of the holographic print 110. During operations of the system 100 as shown, the projector 120 operates to project light 124 that strikes the surface 112 to generate the augmented hologram 130. To this end, the projected light 124 may be thought of as containing content 125 that acts to concurrently reconstruct a hologram 134 and to also display 2D images 136, 138 that may be animated as shown with arrows 137, 139.

Figure 2:
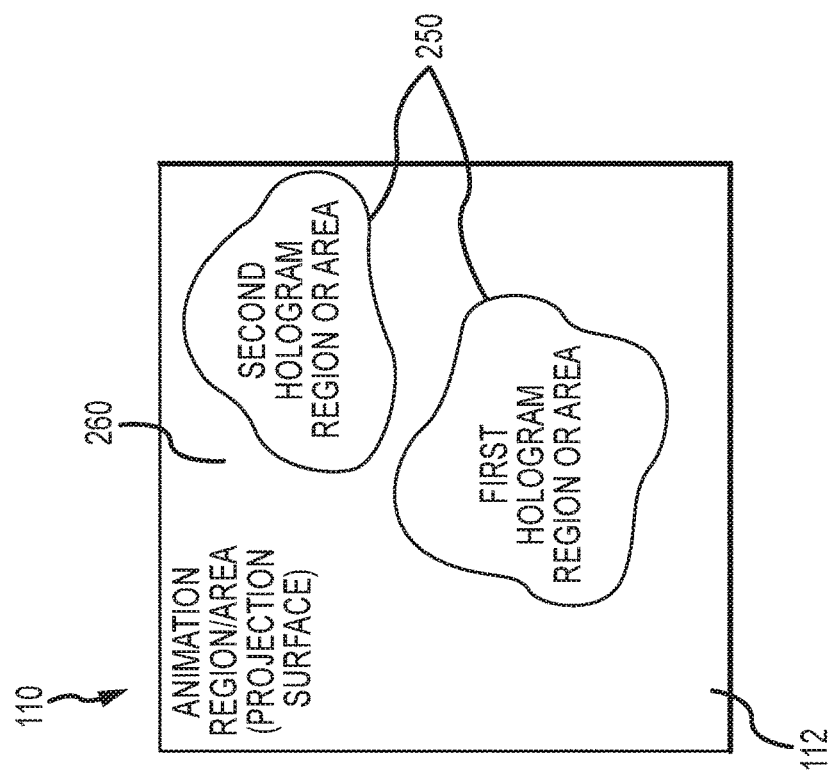
FIG. 2 illustrates schematically the holographic print of FIG. 1 with areas or regions divided into hologram-generating regions or areas and into areas or regions used to augment the hologram (e.g., to provide a projection screen/surface for 2D animation or the like)

FIG. 2 illustrates schematically the holographic print 110 of FIG. 1 with its diffractive surface 112 divided into hologram-generating regions or areas 250 and into areas or regions 260 used to augment the hologram produced by illuminating hologram regions 250. As is common with many holographic prints, the print 110 may be configured to only use a fraction (such as 10 to 80 percent or the like) of the surface area of front/reflective refractive surface 112 to generate a hologram, and the first and second hologram regions or areas 250 are the areas of the print 110 that have a rendition of one or more holograms. The other areas 260 of the reflective or front surface 112 of the holographic print 110 are available for use as (or to provide) a projection screen/surface for 2D animation or the like that can be used to augment the holographic image produced from the hologram regions/areas 250. These augmenting areas 260 may be immediately adjacent or between the hologram regions 250 or may be spaced apart some predefined distance (e.g., 0.25 to 1 inches or the like from outer edges/boundaries of the rendition of the hologram(s)) to avoid generating a second distorted hologram with the light from the projector 120 used to display 2D content 136 and/or 138. Typically, these "projection" areas 260 do not require the holographic print 110 to be specially manufactured or modified as these will simply be areas not printed for reconstructing the holographic image 130.

Figure 3:
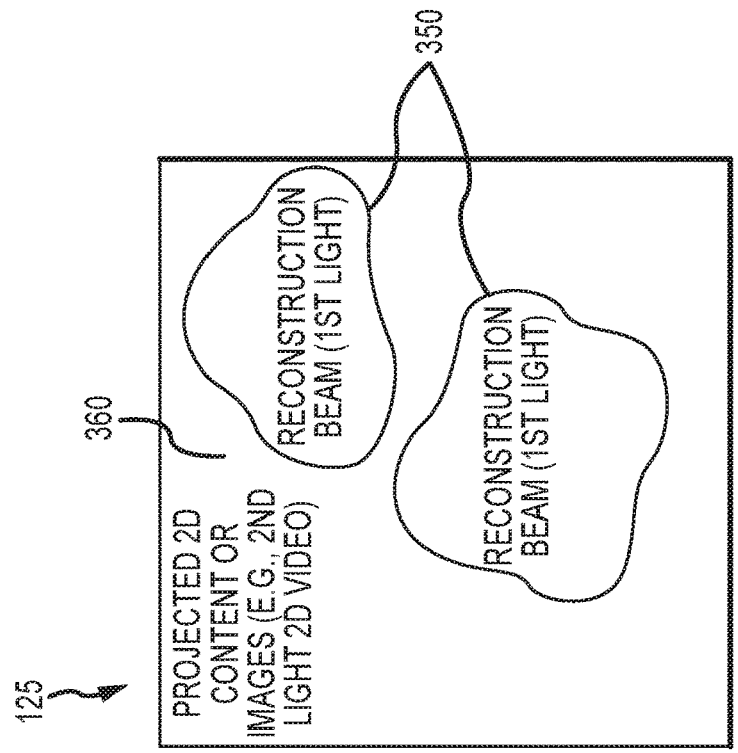
FIG. 3 illustrates schematically the projected light or content as shown being output from the projector of the display system of FIG. 1.

FIG. 3 illustrates schematically the projected light 125 as shown being output in light stream/beam 124 from the projector 120 of the 3D display system 100 of FIG. 1. As can be seen, the projected light 125 includes first light 350 that functions as a reconstruction beam(s) for the hologram. As such, this light 350 may be an even illumination of white light that is sized, shaped, and located so as to at least partially overlap with the hologram regions/areas 250 of the holographic print 110, with preferred embodiments typically matching and aligning the first light 350 with the hologram regions or areas 250 to faithfully reconstruct the hologram that the print 110 was designed to create for or display to viewers. In some cases, it may reduce the brightness of the light 350 relative to the available illumination or brightness ratings of the projector 120 (such as into the range of 60 to 90 percent of maximum projection illumination/brightness) so as to make augmented content more apparent in the augmented hologram 130.

The projected light 125 also includes projected 2D content or images 360. This second portion of the projected light 125 may take the form of 2D video, 2D still images, textual content/data, and the like that may augment the holographic image 134 provided when even illumination or white light 350 strikes the hologram regions 250. The projected 2D content or images 360 typically will be adjacent or spaced apart from the light 350 used to reconstruct the hologram, and it may be sized, shaped, and located so as to be aligned with and strike the animation regions 260 of the holographic print 110 (or to at least partially illuminate one or more portions of this available area 260). In some embodiments of the 3D display system 100, the projected light 125 is configured such that none (or only a very small amount) of the projected 2D content strikes the hologram regions or areas 250 when the projector 120 is operated. Also, while the size, shape, and location of the 2D content 360 may match that of the animation region 260 of the holographic print 110, the 2D content 360 may often be smaller in size than the region or area 260 to assure the hologram regions or areas 250 are not illuminated by the projected 2D content (or with the second light/portion 360 of the projected light 125).

Figure 4:
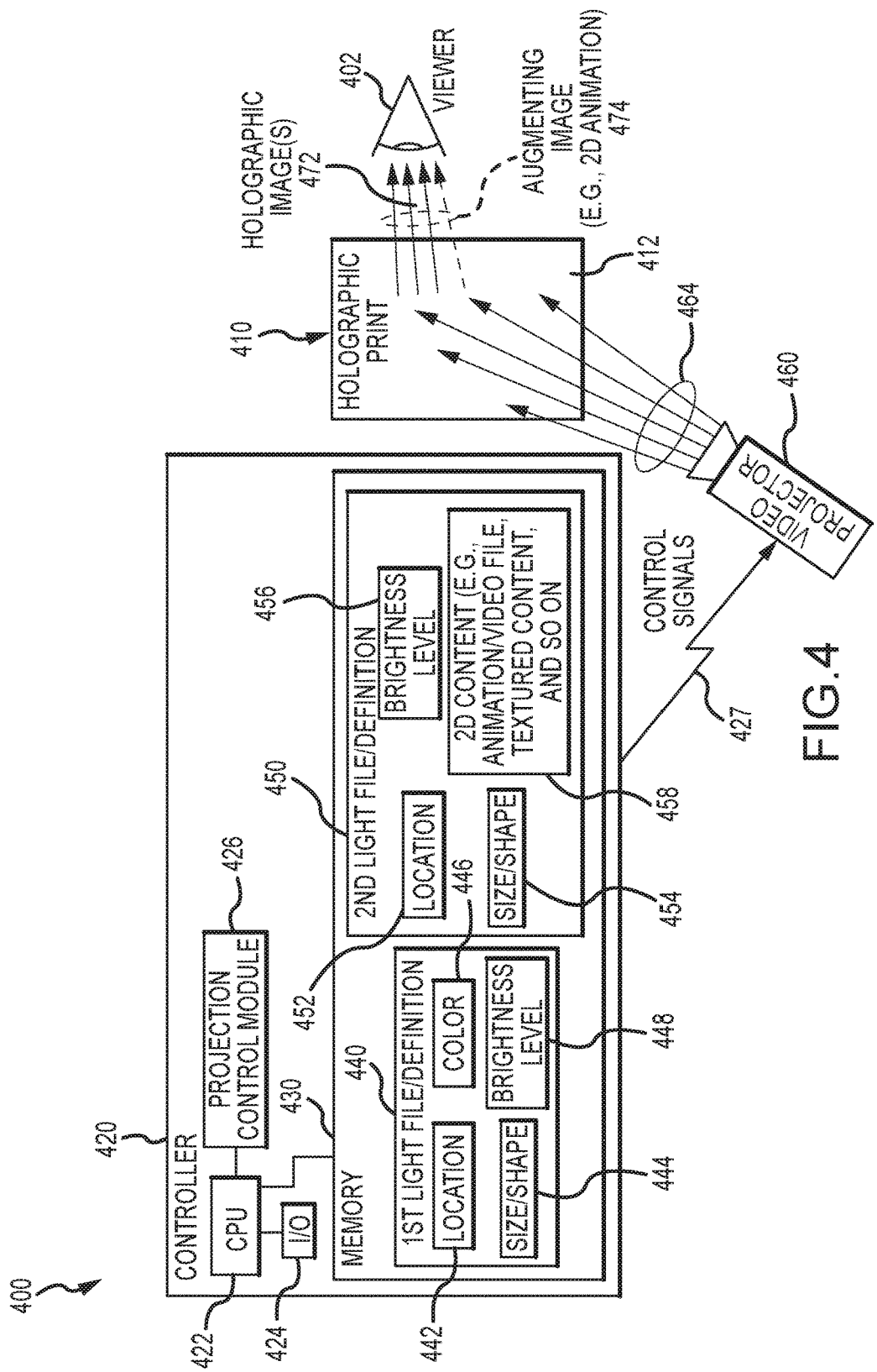
FIG. 4 is a functional block diagram of a 3D display system of the present description.

FIG. 4 is a functional block diagram of a 3D display system 400 of the present description (such as may be used to implement the system 100 of FIGS. 1-3). The 3D display system 400 is operable to output a holographic image 472 concurrently with augmenting images 474 that can be viewed by a viewer 402 such that the viewer 402 perceives a 3D image with, in some cases, dynamic content (e.g., 2D video or static 2D content that is updated or changed over time such as textual data). The 3D display system 400 includes a holographic print or static, reflection hologram element 410 with a front or outward (and typically reflective diffractive) surface 412 that includes one or more holograms that can be reconstructed when illuminated (such as with white light or other even illumination) to provide the holographic image 472. The surface 412 also may include other non-holographic portions or regions that can be used as a projection surface for 2D or other projected content to provide augmenting images (e.g., 2D animation) 474 at the same time the holographic image 472 is displayed to the viewer 402.

The 3D display system 400 further includes a controller 420 that operates to generate control signals 427 to operate a video projector 460 to project the light 464 onto the front, reflective diffractive surface 412 of the holographic print 410. The projected light 464 includes first light for reconstructing the holographic image 472 and also second light that displays 2D content or augmenting images 474 on the surface 412 of the holographic print 410 (e.g., 2D video or other 2D content in the hologram plane while at least a portion of the holographic image 472 will provide a 3D effect by being in front of this plane and/or behind this plane).

The controller 420 includes a processor 422 that executes code or executable instructions in computer-readable medium to provide functions/operations of a projection control module 426, which may include generating and communicating the control signals 427 (in a wired or wireless manner) to the projector 460. The controller 420 also includes input/output (I/O) devices 424 that are managed by the processor 422 along with one or more memory devices/data storage 430. The I/O devices 424 may include devices such as a monitor/display screen, a touch pad/screen, a keyboard, a mouse, voice recognition software, and the like for receiving user/operator input (such as to trigger operation of the projector 460 to project light 464, to select content for augmenting the hologram, to tune brightness levels of the hologram and/or the augmenting imagery 472, 474, and so on).

As shown, the projection control module 426 may create and/or store a first light file/definition 440 and a second light file/definition 450 for use in generating the control signals 427 (e.g., for controlling operation of the projector 460 to provide projected light 464). The file 440 is useful for defining the first portion of the projected light 464 that is used to reconstruct or generate the holographic image(s) 472 by illuminating the surface 412 of the holographic print 410. To this end, the file 440 includes values for defining the location 442, the size/shape 444, and color 446 of the beam(s) of light 464 to be provided by projector 460 to create the hologram 472. The color 446 is chosen to provide even illumination and typically will be white light. The file 440 also includes a setting or value for the brightness level of the beam/first light to be projected by the projector 460 in light 464 to create the hologram 472, and this may be 100 percent of the maximum rating of the projector 460 or, more typically, will be a fraction such as a value in the range of 60 to 90 percent of the intensity rating of the projector 460 to allow the augmented image 474 to be better perceived by the viewer 402 with the holographic image 472 (and to possibly make the augmented image brighter than the holographic image as in glowing particles or highlights).

The second light or second portion of projected light file 450 provides parameters or values defining the portion of the light 464 output by the projector 460 that will be used to create/display the augmenting images 474 when projected onto the surface 412 of the holographic print 410. These parameters/values may include a location 452 (within the projected light 464), a size and/or shape 454, and a brightness level 456 (such as the maximum illumination or intensity level of the projector 460). The location 452 and size/shape 454 values typically differ from those values 442, 444 of the first light file 440 so that the 2D content 474 is displayed on surface 412 in regions/areas that differ and often are spaced apart from those of the print 410 used to reconstruct the hologram 472 for the viewer 402. Further, the second light file/definition 450 includes the 2D content 458 to be displayed in the one or more regions or areas of the front/reflective diffractive surface 412 of the holographic print 410. This content 458 may be animation or video files/media, textual content, or other 2D content. The shape 454 may include calculations such as homographies or keystone correction to account for off-axis projection of the projection onto the holographic plane.

Figure 5:
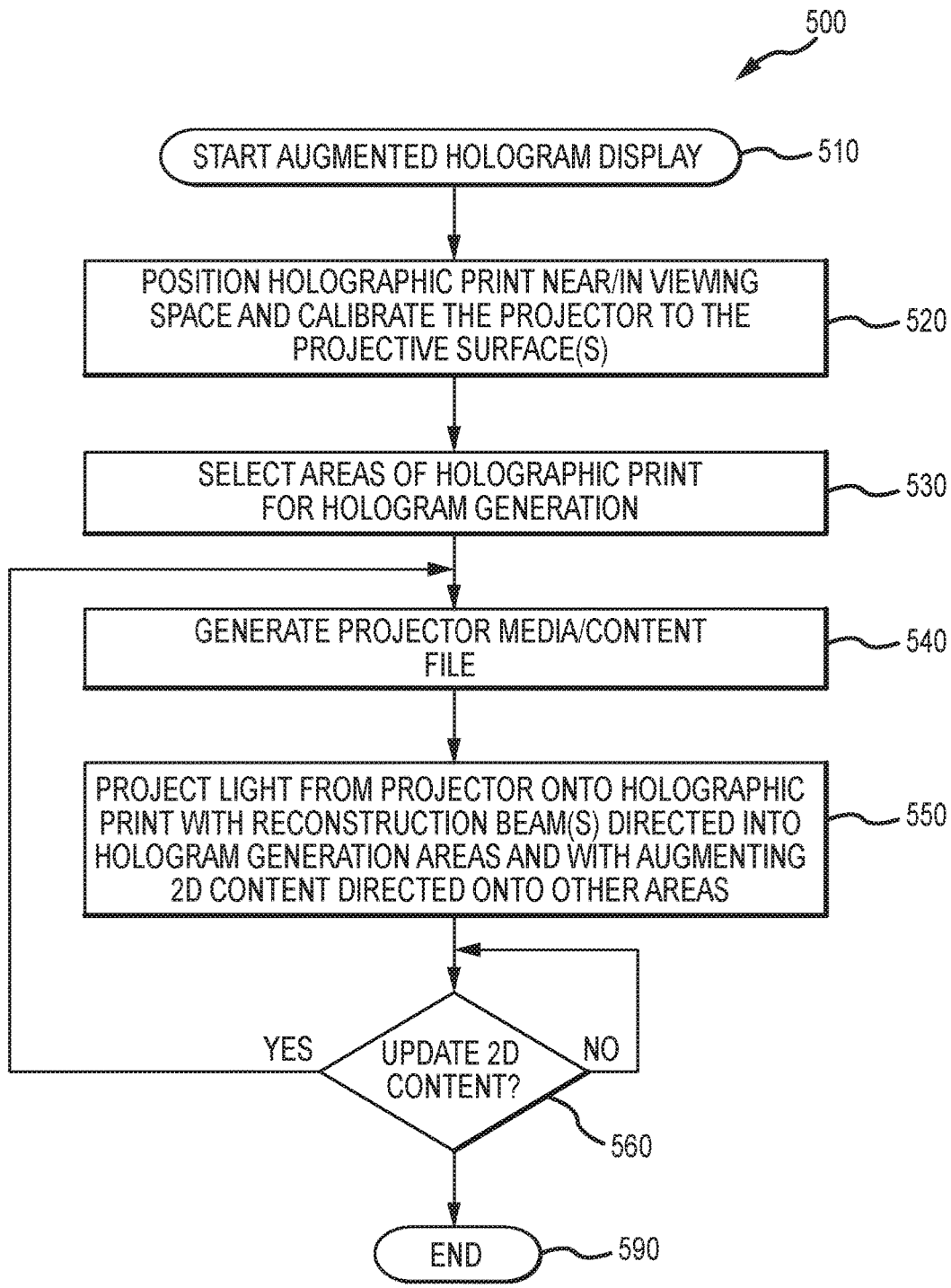
FIG. 5 is a flow diagram of a method of displaying an augmented hologram.

FIG. 5 is a flow diagram of a method 500 of displaying an augmented hologram. The method 500 starts at 510 such as by selecting a holographic print for use in creating a 3D display for viewers in a particular viewing space. Step 520 may also include choosing 2D content for use with the chosen hologram for making the 3D display dynamic rather than only static by storing this content in one or more files of a controller to later be fed to a video projector. The video projector in step 510 may also be linked to the controller and set up so as to target the front or reflective diffractive surface/side of the holographic print. Step 520 then includes positioning the holographic print at the space/location targeted by the video projector and which is nearby or within and/or facing a viewing space. Step 520 may also include calibrating the projector (and rendering algorithms) to correct for off-axis projection or non-planar hologram projection surfaces. The calibrating may include homography/keystone correction, color correction, and/or projection mapping to non-planar surfaces.

At step 530, the method 500 continues with selecting areas/regions of the holographic print for generating one or more holograms or holographic images for viewing by viewers in the viewing space. The other areas, as discussed above, would be available for use as projection surfaces for displaying the 2D content selected in step 510 (e.g., typically only a subset of this space is used for displaying 2D content to avoid projecting the 2D content onto the hologram-generating areas/regions to avoid distortions in the created display). In step 540, a projector media/content file(s) is created that includes one or more reconstruction beams (even illumination provided, typically, with white projector light at a reduced brightness that emanates from the same projective point) and that also includes 2D content, and these two portions of the projector output may be labeled first and second light (or first and second portions of the projector output).

Step 550 then is performed that includes operating the projector with the controller to project light onto the front, reflective diffractive surface of the holographic print. Particularly, step 555 may include the even illumination used to reconstruct the hologram being aligned with the areas/regions chosen in step 530 and the 2D content being aligned with one or more of the areas/regions. At this point in the method 500, a viewer in the viewing space is able to concurrently view or perceive a static hologram (or 3D image) without special eyewear and 2D content (on the plane of the holographic print or its front surface), which may be chosen to be dynamic (video or animation) or at least changeable over time (e.g., to update textual information/data as may be provided in a futuristic 3D control panel or the like).

With this in mind, step 560 involves determining (by the controller and its software) whether the 2D content should be updated (or this may occur automatically simply by playing a media/video file from memory) such as when the augmented hologram is interactive with a viewer. If not, the method 500 continues at 560. If yes, the method 500 continues at 540 with retrieving and/or generating at least the 2D media/content of the projector content file for use in step 550 with operating the projector. The method 500 may alternatively (and at nearly any point in the method 500) end at 590 such as by turning or powering off the projector and/or its controller.

Figure 6:
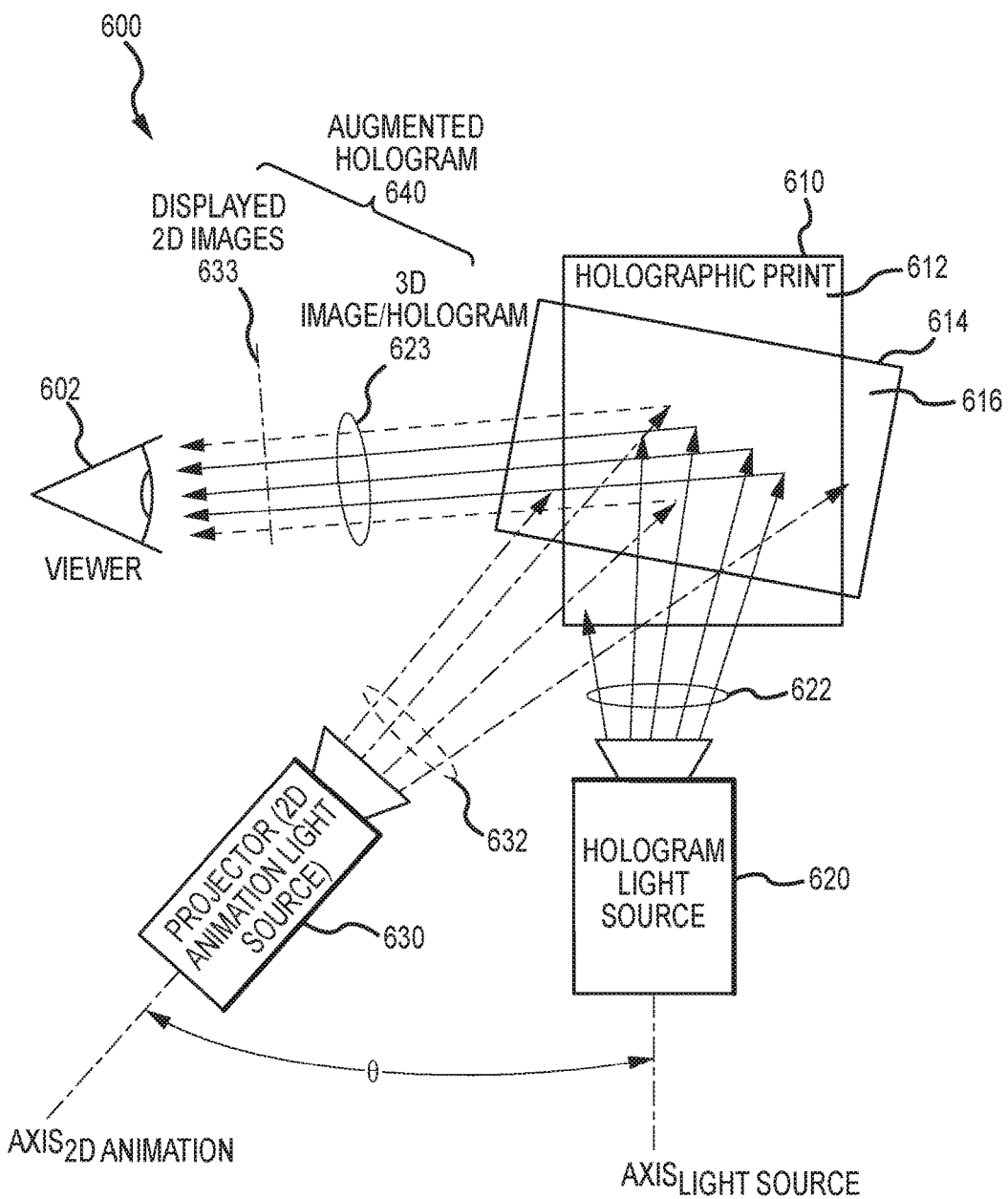
FIG. 6 is a functional block diagram or schematic of another 3D display system of the present description using a second light source and a semi-transparent scattering projection surface (such as a scrim) to augment a hologram.

FIG. 6 is a functional block diagram or schematic of another 3D display system 600 of the present description using a second light source and a scrim (or an augmentation projection surface) to augment a hologram. As with the other systems, the 3D display system 600 includes a holographic print 610 with a front reflective refractive surface 612 and an optional back opaque surface/layer that may be included to increase contrast and/or to provide an opaque surface (otherwise, the hologram is transparent). A hologram or first light source 620 is provided to project even illumination 622 onto the front reflective refractive surface 612 of the holographic print 610 to reconstruct a hologram(s) or 3D image(s). To this end, the light source 620 is positioned or targeted so as to provide the light 622 along an axis, $Axis_{Light\ Source}$, that is within an acceptable range of illumination angles for the holographic print to generate the hologram (e.g., orthogonal to the plane of surface 612 plus or minus 10 to 20 degrees). Light outside of this range of angles will not act to reconstruct a hologram with the print 610.

With this characteristic of the holographic print 610 in mind, the system 600 further includes a second light source 630 that may take the form of a video projector that operates to project light 632 to display 2D content on a projection surface. Particularly, the second light source 630 has its projection axis, $Axis_{2D\ Animation}$, offset from the first light source axis, $Axis_{Light\ Source}$, by a predefined angle, $\theta$, that is chosen to be large enough (in a range of angles) to be outside the reconstruction angle range for the holographic print 610. Instead of projecting the 2D content stream 632 onto the holographic print 610, the system 600 includes a second projection surface 614 (e.g., a semi-transparent scattering projection surface (such as a scrim), a holographic projection film (transparent except that it scatters projected light only from a certain angle), or another useful element) that allows the reconstructing light 622 to pass but also has enough surface area to receive and display the 2D content 632 from projector 630. This surface may be in front of, in contact with, or behind (in the case of a reflective hologram without the opaque backing layer). The surface may also be a second 3D hologram that is reconstructed with light from a different range of angles providing multiple layers of 3D holograms and/or augmenting 2D animations. This can be used to create a layered or volumetric augmented hologram. Holograms (especially holographic stereograms) have deep but limited depth range of 3D objects. Multiple layers of holograms extend this depth range. Multiple layers of 2D augmentation provide more layers of animation with a sense of volume to augment the more continuous depth provided by the 3D hologram(s).

As shown, in use, the system 600 is effective for displaying to a viewer 602 a 3D image or hologram as light 622 from the hologram or first light source 620 is reflectively diffracted from surface 612 as shown at 623. Concurrently, the system 600 displays 2D images as shown at 633 (that appear on the plane/surfaces 616 of the scrim 614) when light 632 from the second light source/projector 630 strikes the scrim (or other semi-transparent scattering projection) surfaces 616. Together, the images 623, 633 are perceived by the viewer 602 as an augmented hologram 640 or as a static hologram 623 with dynamic 2D features/imagery 633.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

For example, each of the projectors in the 3D display systems may be arranged to project downward onto the holographic print. Further, the projected light may be configured or designed to provide keystone correction. The 2D content/imagery is provided in a single surface or in/on multiple surfaces (e.g., the front surface of holographic prints and/or scrims).

Head tracking may also be used to provide additional simulated parallax and occlusion effects in the planar or layered 2D content imagery that is consistent with 3D content observed from a viewer's viewpoint. However, this restricts the viewing of the augmented hologram to one or a few viewers with similar viewpoints.

I claim:

1. A system for displaying to viewers static three dimensional (3D) images that are dynamically augmented with two dimensional (2D) images, comprising:
   a reflection holographic print with a front surface; and
   a projector projecting light onto the front surface,
   wherein the projected light comprises first light reconstructing a hologram from the front surface of the reflection holographic print and second light displaying 2D content on the front surface,
   wherein the projected light from the projector is configured to direct the first light onto a first region of the front surface and to direct the second light onto a second region of the front surface differing from the first region with no overlap of the first and second regions on the front surface,
   wherein the first region of the front surface corresponds to areas of the reflection holographic print configured prior to the projector projecting the light to provide a rendition of the hologram, and
   wherein the second region of the front surface corresponds to areas of the reflection holographic print free of holographically recorded content.

2. The system of claim 1, wherein the reflection holographic print further includes an opaque back layer opposite the front surface.

3. The system of claim 1, wherein the first light comprises even illumination.

4. The system of claim 3, wherein the projector is positioned to cause the first light to strike the front surface at an angle within a range of hologram reconstruction angles for the reflection holographic print.

5. The system of claim 3, wherein the projector is a color video projector and the first light consists substantially of white light.

6. The system of claim 5, wherein the projector provides the first light at a brightness level that is less than 90 percent of a maximum brightness capacity for the projector.

7. The system of claim 1, wherein the displayed 2D content includes animation or dynamic video content.

8. The system of claim 1, further comprising one or more additional reflection holographic prints each with front surfaces and wherein the one or more additional reflection holographic prints and the reflection holographic print are positioned with the front surfaces spaced apart from each other and wherein the projected light reconstructs additional holograms from the front surfaces of the additional reflection holographic prints.

9. The system of claim 1, further comprising a head tracking assembly tracking a viewer's position and wherein the system operates to provide at least one of simulated parallax or occlusion effects in the 2D content consistent with the hologram for a viewpoint associated with viewer's tracked position.

* * * * *